(12) United States Patent
Semeria et al.

(10) Patent No.: US 10,990,159 B2
(45) Date of Patent: Apr. 27, 2021

(54) ARCHITECTED STATE RETENTION FOR A FREQUENT OPERATING STATE SWITCHING PROCESSOR

(71) Applicant: Apple Inc., Cupertino, CA (US)

(72) Inventors: Bernard Joseph Semeria, Palo Alto, CA (US); John H. Mylius, Gilroy, CA (US); Pradeep Kanapathipillai, Santa Clara, CA (US); Richard F. Russo, San Jose, CA (US); Shih-Chieh Wen, San Jose, CA (US); Richard H. Larson, Saratoga, CA (US)

(73) Assignee: Apple Inc., Cupertino, CA (US)

( * ) Notice: Subject to any disclaimer, the term of this patent is extended or adjusted under 35 U.S.C. 154(b) by 67 days.

(21) Appl. No.: 15/496,290

(22) Filed: Apr. 25, 2017

(65) Prior Publication Data

US 2018/0307297 A1    Oct. 25, 2018

(51) Int. Cl.
| | | |
|---|---|---|
| *G06F 9/38* | (2018.01) | |
| *G06F 3/06* | (2006.01) | |
| *G06F 1/3287* | (2019.01) | |
| *G06F 1/3228* | (2019.01) | |

(Continued)

(52) U.S. Cl.
CPC .......... *G06F 1/3287* (2013.01); *G06F 1/3206* (2013.01); *G06F 1/3228* (2013.01); *G06F 1/3296* (2013.01); *G06F 3/065* (2013.01); *G06F 3/067* (2013.01); *G06F 3/0619* (2013.01); *G06F 3/0625* (2013.01); *G06F 9/3802* (2013.01)

(58) Field of Classification Search
CPC ..... G06F 3/0625; G06F 9/3802; G06F 1/3287
See application file for complete search history.

(56) References Cited

U.S. PATENT DOCUMENTS

| | | | |
|---|---|---|---|
| 8,364,857 B2 | 1/2013 | Pyers et al. | |
| 8,694,976 B2 | 4/2014 | Samra | |
| 9,213,401 B2 * | 12/2015 | Sakarda | G06F 1/3287 |

(Continued)

OTHER PUBLICATIONS

International Search Report and Written Opinion in International Application No. PCT/US2018/029211, dated Jul. 23, 2018, 12 pages.

(Continued)

*Primary Examiner* — Michelle T Bechtold
(74) *Attorney, Agent, or Firm* — Kowert Hood Munyon Rankin and Goetzel PC; Rory D. Rankin (57) ABSTRACT

Systems, apparatuses, and methods for retaining architected state for relatively frequent switching between sleep and active operating states are described. A processor receives an indication to transition from an active state to a sleep state. The processor stores a copy of a first subset of the architected state information in on-die storage elements capable of retaining storage after power is turned off. The processor supports programmable input/output (PIO) access of particular stored information during the sleep state. When a wakeup event is detected, circuitry within the processor is powered up again. A boot sequence and recovery of architected state from off-chip memory are not performed. Rather than fetch from a memory location pointed to by a reset base address register, the processor instead fetches an instruction from a memory location pointed to by a restored program counter of the retained subset of the architected state information.

20 Claims, 8 Drawing Sheets (51) Int. Cl.
    *G06F 1/3206*     (2019.01)
    *G06F 1/3296*     (2019.01)

(56) References Cited

U.S. PATENT DOCUMENTS

| | | |
|---|---|---|
| 9,383,812 B2 | 7/2016 | Conrad et al. |
| 9,426,750 B2 | 8/2016 | Elsayed et al. |
| 9,465,647 B2 | 10/2016 | Natu et al. |
| 2004/0034802 A1 | 2/2004 | Hamilton |
| 2004/0088488 A1* | 5/2004 | Ober ............... G06F 9/3802 711/125 |
| 2006/0069738 A1* | 3/2006 | Hoogerbrugge ...... G06F 1/3228 709/213 |
| 2007/0157036 A1 | 7/2007 | Jahagirdar et al. |
| 2009/0089562 A1* | 4/2009 | Schuchman ........ G06F 1/3203 712/228 |
| 2014/0040543 A1* | 2/2014 | Natu ................. G06F 9/461 711/105 |
| 2015/0081980 A1* | 3/2015 | Walker ............... G06F 12/0802 711/135 |

OTHER PUBLICATIONS

Notice of Preliminary Rejection in Korean Patent Application No. 10-2019-7031865, dated Feb. 5, 2021, 16 pages.

\* cited by examiner

ARCHITECTED STATE RETENTION FOR A FREQUENT OPERATING STATE SWITCHING PROCESSOR

BACKGROUND

Technical Field

Embodiments described herein relate to the field of processors and more particularly, to retaining architected state for relatively frequent switching between sleep and active operating states.

Description of the Related Art

A computing system such as a semiconductor chip includes multiple functional blocks or units, each capable of processing data. In various embodiments, the multiple functional units are individual dies on one of a system on a chip (SOC), a multi-chip module (MCM) or a printed circuit board. The operating system determines when particular processor is idle, in addition to detecting no more applications to process as well as a duration threshold has elapsed. In such cases, the operating system sends instructions of a shutdown procedure for the particular processor to execute for transitioning to a sleep state.

The processor saves architected state to off-chip memory as part of the shutdown procedure. Doing so increases the latency for entering a sleep state as well as increases power consumption. At a later time, a wakeup event is detected and the processor is powered back up, restores the architected state from the off-chip memory and fetches an instruction stored in a memory location pointed to by an address stored in a reset base address register. The processor begins a boot sequence. An appreciable amount of time and power is consumed to repeatedly put the processor in a sleep state and later wake up the processor. In addition, a significant number of instructions are used for the shutdown procedure and the power up procedure. In some cases, the processor transitions between the active state and the sleep state a few hundred times per second. As a consequence, the processor is inefficiently used as well as consuming a significant amount of power.

SUMMARY

Systems and methods for retaining architected state for relatively frequent switching between sleep and active operating states are contemplated. A computing system, such as a system on a chip (SOC) in various embodiments, accesses external (off-chip) memory for instructions and data of one or more software applications. The instructions and data are initially stored in a cache memory subsystem prior to being fetched by one or more processors within the SOC. During the processing of the software applications, each processor maintains respective architected state information. When the operating system scheduler determines a particular processor is idle, in addition to there are no more applications to process as well as a duration threshold has elapsed, the scheduler begins a shutdown process for the particular processor for transitioning to a sleep state.

In various embodiments, during the shutdown process, the particular processor stores a copy of a first subset of the architected state information in on-die storage elements. In various embodiments, these retaining storage elements use a balloon latch scheme, a shadow latch scheme or similar mechanism for efficiently storing the architected state for relatively fast restore upon the occurrence of a later power-up sequence.

In some embodiments, the first subset includes one or more of the program counter (PC), the stack pointer (SP), the link register (LR), exception levels and accompanying information, a software step value, and other similar information. In contrast to a context switch, not all of the architected state is used again upon a later return to an active state from a sleep state. For example, the values stored in the integer and floating-point general purpose registers (GPRs) are not retained as they are not used again upon the later return to an active state. Rather, these values are initialized upon a later return to a processor active state.

In an embodiment, the processor supports programmable input/output (PIO) access of particular stored information during the sleep state. Permission checking may occur to allow for only valid accesses even for read accesses. When a wakeup event is detected, circuitry within the processor is powered up again. The steps of a boot sequence and recovery of architected state from off-chip memory are not performed as these steps are not needed. After the processor is powered up again, rather than use a boot up sequence, such as fetching from a memory location pointed to by a reset base address register, the processor instead fetches an instruction from a memory location pointed to by an address stored in a restored program counter of the retained subset of the architected state information. In some embodiments, the fetched instruction is part of an interrupt service routine (ISR).

These and other embodiments will be further appreciated upon reference to the following description and drawings.

BRIEF DESCRIPTION OF THE DRAWINGS

The above and further advantages of the methods and mechanisms may be better understood by referring to the following description in conjunction with the accompanying drawings, in which.

While the embodiments described in this disclosure may be susceptible to various modifications and alternative forms, specific embodiments thereof are shown by way of example in the drawings and will herein be described in detail. It should be understood, however, that the drawings and detailed description thereto are not intended to limit the embodiments to the particular form disclosed, but on the contrary, the intention is to cover all modifications, equivalents and alternatives falling within the spirit and scope of the appended claims. As used throughout this application, the word "may" is used in a permissive sense (i.e., meaning having the potential to), rather than the mandatory sense (i.e., meaning must). Similarly, the words "include," "including," and "includes" mean including, but not limited to.

Various units, circuits, or other components may be described as "configured to" perform a task or tasks. In such contexts, "configured to" is a broad recitation of structure generally meaning "having circuitry that" performs the task or tasks during operation. As such, the unit/circuit/component can be configured to perform the task even when the unit/circuit/component is not currently on. In general, the circuitry that forms the structure corresponding to "configured to" may include hardware circuits. Similarly, various units/circuits/components may be described as performing a task or tasks, for convenience in the description. Such descriptions should be interpreted as including the phrase "configured to." Reciting a unit/circuit/component that is configured to perform one or more tasks is expressly intended not to invoke 35 U.S.C. § 112(f) for that unit/circuit/component.

DETAILED DESCRIPTION OF EMBODIMENTS

In the following description, numerous specific details are set forth to provide a thorough understanding of the embodiments described in this disclosure. However, one having ordinary skill in the art should recognize that the embodiments might be practiced without these specific details. In some instances, well-known circuits, structures, and techniques have not been shown in detail for ease of illustration and to avoid obscuring the description of the embodiments.

Figure 1:
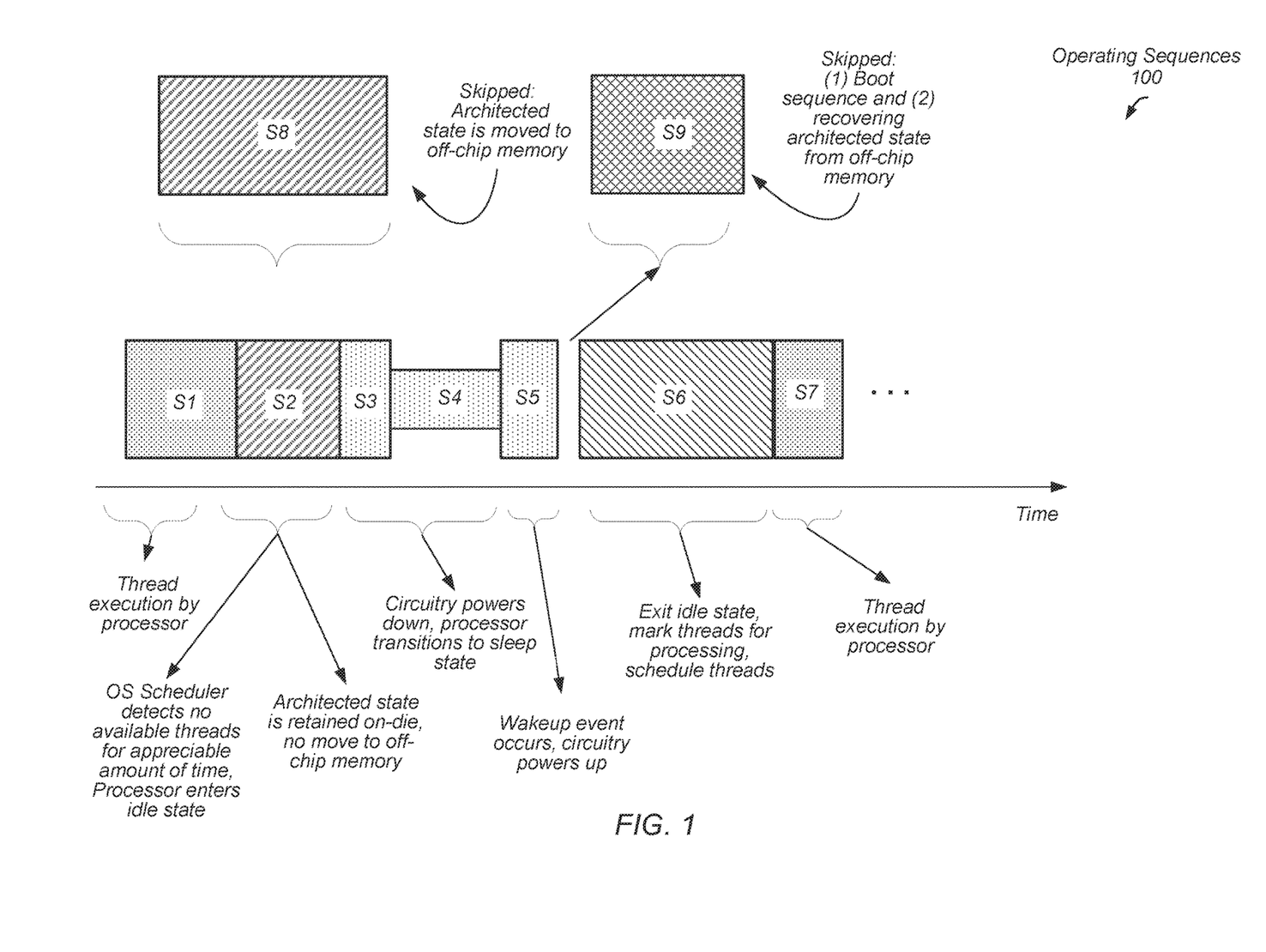
FIG. 1 is a block diagram of one embodiment of wakeup and sleep latencies in operating sequences.

Referring to FIG. 1, a generalized block diagram of one embodiment of wakeup and sleep latencies in operating sequences 100 is shown. In the illustrated embodiment, a series of sequences S1 to S7 are used to describe different periods of operation for a computing system which retains architected state without storage in external memory. The sequences begin when threads are executed by a processor in an active state, transitions to an idle state and a later sleep state for the processor, and transitions again based on a wakeup event. The wakeup event causes the processor to re-enter an active state and execute threads again. Due to not retaining architected state in memory external to the processor, the latencies for the sequences are reduced, the energy consumption is reduced and an amount of software instructions processed to perform the transitions is also reduced. As shown, the sequence S8 is replaced with the shortened sequence S2. The sequence S9 is removed from occurring between sequences S5 and S6. A description of the sequences follows.

In sequence S1, threads are executed by a processor. The processor is operating in one of multiple awake (active) states. The active state in use may be selected based on one or more of an operating mode and a power-performance state (P-state) indicated by a power manager. The kernel of an operating system divides the one or more software applications into processes. In various embodiments, each process uses an address space for indicating the memory locations used for storing the instructions of the application, data for the application, a heap, a stack, architected state information such as stack pointers, general and floating-point registers, a program counter and so on. The kernel further divides the processes into threads, and determines which threads are allocated to the processor. The operating system scheduler within the kernel performs the allocation (scheduling) of the threads. Although multiple processors may be used in a computing system, the following description refers to a single processor for ease.

In sequence S2, the operating system scheduler detects no threads are available for execution for an appreciable amount of time. In some embodiments, a programmable threshold duration has elapsed since the scheduler scheduled the last thread. The kernel begins assigning instructions of a shutdown procedure to the processor. In some embodiments, the number of instructions for the shutdown procedure exceeds 3,000 instructions. However, in sequence S2, the architected state is not moved to off-chip memory and the number of instructions is reduced. Rather, at least a subset of the architected state is retained in on-die storage elements. The processor foregoes storing any copy of the architected state information in the off-chip memory.

In various embodiments, retention storage elements are used for retaining architected state within the processor in place of storing a copy of the architected state in off-chip memory. The retention storage elements use a third latch within a flip-flop (master-slave latches) circuit for relatively efficient storage and retrieval of information. The third latch is powered by a separate power supply than the power supply used for the master and slave latches of the flip-flop circuit. In various embodiments, the power supply for the third latch uses a smaller supply voltage magnitude than the power supply used for the master and slave latches. A further description of the retention storage elements is provided later.

As the architected state is not moved to memory external to the processor, the number of instructions performed for the shutdown procedure is significantly reduced. For illustrative purposes, the sequence S8 represents the shutdown procedure with the processor architected state transferred to external memory such as system memory (e.g., DRAM). The sequence S8 is significantly larger than the sequence S2 where the processor architected state is not transferred to external memory.

Examples of the architected state retained on-chip, rather than retained off-chip, are the program counter (PC), the stack pointer (SP), the link register (LR), values stored in special-purpose registers (SPRs), supervisor flags, interrupt flags, exception levels and accompanying information, a software step value, and other similar information. Since the processor is transitioning from an active state to an idle state and further to an upcoming sleep state, not all of the architected state is retained. In contrast to a context switch, not all of the architected state is used again upon a later return to an active state. For example, in various embodiments, the values stored in the integer and floating-point general purpose registers (GPRs) are not retained as they are not used again upon the later return to an active state.

In various embodiments, condition codes (flags) are used for determining how an instruction is processed based on the result of a previous (in program order) instruction. Some examples of the condition codes are the negative flag (N), the zero flag (Z), the carry flag (C), and the overflow flag (V). In various embodiments, these condition codes are not retained in sequence S2. Additionally, electronic fuses (eFuses) are used to provide one-time programmable, non-volatile, and non-erasable settings. Examples of these settings are boot image authentication and encryption. In various embodiments, these settings are also not retained in sequence S2. Therefore, a first subset of the architected state is retained in on-die storage elements, whereas a second subset of the architected state is not retained.

In addition to retaining on-chip the first subset of the architected state information during sequence S2, the processor is directed by the instructions of the shutdown procedure to also perform on-chip retaining of non-architected state information. Examples of the non-architected state information are one or more private keys used for a variety of cryptographic operations, one or more performance counters, branch prediction values, one or more error registers, one or more peripheral control timers and registers indicating a communication protocol or identifier of a particular peripheral device being used, and so on.

After the first subset of the architected state and any non-architected state is retained in sequence S2, the processor is directed by the instructions of the shutdown procedure to flush one or more levels of the cache memory subsystem. In some embodiments, a particular instruction is used by the shutdown procedure. For example, a wait-for-interrupt (WFI) instruction causes the processor to wait for any remaining other instructions from threads in the processor to retire before entering an idle or low power state. The WFI instruction directs the processor to ensure each explicit memory access instruction before the WFI instruction in program order has retired. Afterward, the processor is reset and power switches are turned off. The sequence S3 represents the time elapsed for the circuitry in the processor to reach steady states. The sequence S4 represents the amount of time the processor is in the sleep state.

During the sequence S4 where the processor is in the sleep state, the processor supports programmable input/output (PIO) access of particular information stored in the processor. For these accesses, the processor temporarily powers up a portion of the processor, performs the read or write access, and then powers down the portion of the processor. For example, performance counters may be accessed. A variety of other examples of the retained information may also be accessed. In various embodiments, permission checking occurs to allow for only valid accesses even for read accesses.

In sequence S5, a wakeup event is detected and circuitry within the processor is powered up again. For example, the operating system scheduler may detect threads are once again available for execution as a new workload arrives. As shown, the steps of a boot sequence and recovery of architected state from off-chip memory are skipped. These steps are represented by the sequence S9 which is not included in the series of sequences S1 to S7.

After the processor is powered up again, rather than use a boot up sequence, such as fetching from a memory location pointed to by a reset base address register, the processor in sequence S6 instead fetches an instruction from a memory location pointed to by a restored program counter of the retained first subset of the architected state information. As no architected state information was retained in off-chip memory, there is no architected state information to recover from off-chip memory in sequence S6.

In sequence S6, the processor exits the idle state, initializes the second subset of the architected state information which was not retained, resets control logic such as for the cache controllers and other portions of the processor, returns to an active state, and fetches from the restored program counter. In some embodiments, the address which is an incremented address of the restored program counter points to an interrupt handler. Once the corresponding subroutine completes, the sequence S7 begins. In sequence S7, similar to the sequence S, the processor executes threads.

Figure 2:
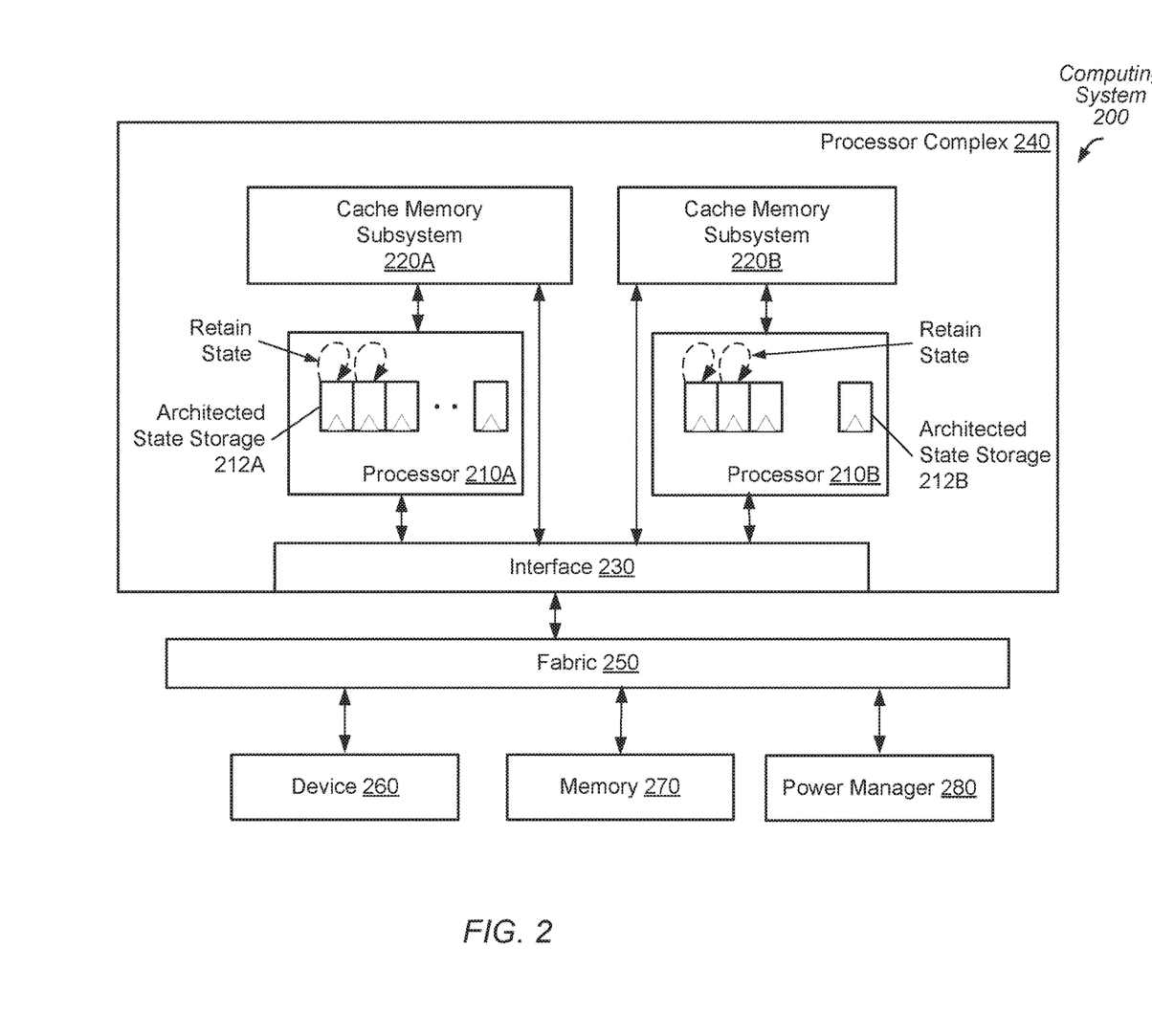
FIG. 2 is a block diagram of one embodiment of a computing system.

Referring to FIG. 2, a generalized block diagram of one embodiment of a computer system 200 is shown. As shown, a communication fabric 250 routes traffic between the device 260, memory 270, power manager 280 and the processor complex 240. In various embodiments, the computing system 200 is a system on a chip (SOC) that includes multiple types of integrated circuits on a single semiconductor die, each integrated circuit providing a separate functionality. In other embodiments, the multiple functional units are individual dies within a package, such as a multi-chip module (MCM). In yet other embodiments, the multiple functional units are individual dies or chips on a printed circuit board.

Clock sources, such as phase lock loops (PLLs), various input/output (I/O) interfaces, interrupt controllers, and so forth are not shown in FIG. 2 for ease of illustration. It is also noted that the number of components of the computing system 200 (and the number of subcomponents for those shown in FIG. 2, such as within each of the processor complex 240) may vary from embodiment to embodiment. There may be more or fewer of each component/subcomponent than the number shown for the computing system 200.

In various embodiments, different types of traffic flows independently through the fabric 250. The independent flow is accomplished by allowing a single physical fabric bus to include a number of overlaying virtual channels, or dedicated source and destination buffers, each carrying a different type of traffic. Each channel is independently flow controlled with no dependence between transactions in different channels. The fabric 250 may also be packet-based, and may be hierarchical with bridges, cross bar, point-to-point, or other interconnects.

The power manager 280 may be configured to control the supply voltage magnitudes requested from an external power management unit. There may be multiple supply voltages generated by the external power management unit for the computing system 200.

In some embodiments, logic local to various components may control the power states of the components, including power up and power down and various other power-performance states (P-states) and operating modes for those components that support more than one P-state and operating mode. In various embodiments, the P-state is used to determine the operational voltage and operational frequency used by a component, whereas the operating mode determines how many sub-components are powered up.

In other embodiments, the power manager 280 may control power up and power down of other components of the computing system 200, or a combination of local control for some components and control by the power manager 280 for other components may be supported. The power manager 280 may be under direct software control (e.g. software may directly request the power up and/or power down of components) and/or may be configured to monitor the computing system 200 and determine when various components are to be powered up or powered down.

The external power management unit may generally include the circuitry to generate supply voltages and to provide those supply voltages to other components of the system such as the computing system 200, the off-die memory 270, various off-chip peripheral components (not shown in FIG. 2) such as display devices, image sensors, user interface devices, etc. The external power management unit may thus include programmable voltage regulators, logic to interface to the computing system 200 and more particularly the power manager 280 to receive voltage requests, etc.

As used herein, the term "processor complex" is used to denote a configuration of one or more processor cores using local storage, such as a shared cache memory subsystem, and configured to process a workload together. Additionally, the processor complex is coupled through a communication channel subsystem to other components. As shown, processor complex 240 uses an interface 230 for providing memory access requests and responses to at least the processors 210A-210B. Processor complex 240 also supports the cache memory subsystems 220A-220B. In some embodiments, each of cache memory subsystems 220A-220B uses an off-die level two (L2) cache for the processors 210A-210B and may use a shared L3 cache. Other configurations for the cache memory subsystems 220A-220B are also possible and contemplated. Processor complex 240 may use the interface 230 for communication with the fabric 250.

In some embodiments, the processors 210A-210B use a homogeneous architecture. For example, each of the processors 210A-210B is a general-purpose processor, such as a central processing unit (CPU), which utilizes circuitry for executing instructions according to a predefined general-purpose instruction set. For example, the ARM®, x86®, x86-64®, Alpha®, MIPS®, PA-RISC®, SPARC® or any other instruction set architecture may be selected. In some embodiments, each core within a CPU supports the out-of-order execution of one or more threads of a software process and include a multi-stage pipeline.

In other embodiments, the processors 210A-210B use a heterogeneous architecture. In such embodiments, one or more of the processors 210A-210B is a highly parallel data architected processor, rather than a CPU. In some embodiments, these other processors of the processors 210A-210B use single instruction multiple data (SIMD) cores. Examples of SIMD cores are graphics processing units (GPUs), digital signal processing (DSP) cores, or otherwise.

In various embodiments, each one of the processors 210A-210B uses one or more cores and one or more levels of a cache memory subsystem. The processors 210A-210B use multiple one or more on-die levels (L1, L2, L2 and so forth) of caches for accessing data and instructions. While processing threads corresponding to software applications, the processors 210A-210B store copies of respective architected state. As shown, the architected state is stored in storage elements 212A-212B. A subset of each of the architected state is capable of being retained.

Generally, a particular one of the processors 210A-210B may be active if it is powered up. The processor may be available for instruction execution with little delay (e.g., it may be clock gated, but may be ungated if instructions are ready to execute). The processor may be inactive if it is powered off or in another low power state in which a significant delay may be experienced before instructions may be executed. For example, if the processor requires a reset or a relock of a phase lock loop (PLL), it may be inactive even if it remains powered.

One or more of the processors 210A-210B may be configured to provide activity levels to the power manager 280. Alternatively, a control unit within the processors 210A-210B monitors the activity levels and sends suggestions to the power manager 280 regarding which operating mode to select. When the processors 210A-210B are relatively idle for an appreciable amount of time, the external power management unit may be directed by software, such as the operating system kernel, to begin assigning instructions of a shutdown procedure to the processors 210A-210B. During the shutdown (powered-down) sequence, the architected state is not moved to off-chip 280. Rather, at least a subset of the architected state is retained in on-die storage elements 212A-212B. In various embodiments, the subset of the storage elements 212A-212B uses a balloon latch scheme, a shadow latch scheme or similar mechanism for efficiently storing the architected state for relatively fast restore upon the occurrence of a later power-up sequence. These schemes are further described later in FIGS. 3 and 4.

As the architected state is not moved from the processors 210A-210B to the external memory 270, the number of instructions performed for the shutdown procedure is significantly reduced. Additionally, the response time is also reduced. Further, the power consumption for the shutdown procedure is also reduced. In contrast to a context switch, not all of the architected state is used again upon a later return to an active state for the processors 210A-210B. For example, in various embodiments, the values stored in the integer and floating-point general purpose registers (GPRs) are not retained as they are not used again upon the later return to an active state. Therefore, a first subset of the architected state is retained in on-die storage elements, whereas a second subset of the architected state is not retained. In addition to retaining the first subset of the architected state information in the on-die storage elements 212A-212B during the shutdown procedure, in some embodiments, the processors 210A-210B are directed by the instructions of the shutdown procedure to also perform on-chip retaining of non-architected state information.

In some embodiments, the processors 210A-210B continue to prepare to go into a sleep state where they will be later wakened up to service an interrupt. One indication for performing these steps is processing a particular instruction. In some embodiments, a wait-for-interrupt (WFI) instruction causes the processors 210A-210B to wait for any remaining other instructions before the WFI instruction in program order has retired, flush one or more levels of caches, reset and turn off power switches. The processors 210A-210B retain at least the subset of architected state information prior to turning off the power switches. The retaining storage elements of the elements 212A-212B use at least two power supplies. One power supply is used for the storage element such as a flip-flop circuit and the control logic for selecting a data input and enabling or disabling the clock signal. This power supply may be turned off. Another power supply is used for the retention logic used within retaining storage elements and it is not turned off.

In an embodiment, the processors 210A-210B support programmable input/output (PIO) access of particular stored information during the sleep state. This particular information is stored in the retaining storage elements of the elements 212A-212B. For these accesses, the processors 210A-210B temporarily power up a portion of their components including the selected retaining storage elements, perform the read or write access, and then powers down the components again. In various embodiments, permission checking occurs to allow for only valid accesses even for read accesses.

When a wakeup event is detected, such as an interrupt indicating threads are available again for processing, circuitry within the processors 210A-210B are powered up again. The steps of a boot sequence and recovery of architected state from off-chip memory 270 are not performed as these steps are not needed. Therefore, response times are faster and power consumption is decreased for the power-up sequence. The processors 210A-210B turn on power switches. After the processor is powered up again, rather than use a boot up sequence, such as fetching from a memory location pointed to by a reset base address register, the processors 210A-210B instead fetch an instruction from a memory location pointed to by a restored program counter of the retained subset of the architected state information. In some embodiments, the fetched instruction is part of an interrupt service routine (ISR).

Each of the processors 210A-210B exits the sleep state, initializes the subset of the architected state information which was not retained, resets control logic such as for the cache controllers and other portions of the processor, returns to an active state, and fetches from the restored program counter. Afterward, the processors 210A-210B once again execute threads. Before continuing with further details of retaining at least a subset of the architected state, a further description of the remaining components of the computing system 200 is provided.

In various embodiments, the external power management unit determines the P-state for the processor complex 240, and thus, the same operational voltages and operational clock frequencies for the processors 210A-210B. In an embodiment, the P-state and the operating mode is relayed to the processors 210A-210 through the power manager 280 and the fabric 250. In some embodiments, the device 260 is an on-chip device such as an on-chip functional unit. Alternatively, the device 260 any variety of computer peripheral devices or other off-chip devices. Examples of the device 260 are audio, video, camera, and telephony controllers as well as various analog, digital, mixed-signal and radio-frequency (RF) functional units, and so on. A single device is shown for ease of illustration, but in various embodiments, any number of devices may be connected to the fabric 250 for use in the computing system 200.

The fabric 250 and corresponding interfaces support a variety of communication protocols such as Universal Serial Bus (USB), peripheral component interconnect (PCI) including PCI Express (PCIe), serial and parallel ports, general-purpose I/O (GPIO), a universal asynchronous receiver/transmitter (uART), a FireWire interface, an Ethernet interface, an analog-to-digital converter (ADC), a digital-to-analog converter (DAC), and so forth. Other I/O devices may also include networking peripherals such as media access controllers (MACs) in the respective fabric interface.

The interface 230 in the processor complex 240 uses at least one memory controller for the off-chip memory 270 such as synchronous DRAM (SDRAM). The interface 230 stores memory requests in request queues, uses any number of memory ports, and uses circuitry configured to interface to memory using one or more of a variety of protocols used to interface with memory channels used to interface to one or more memory devices used to implement the memory 270. The interface 230 may be responsible for the timing of the signals, for proper clocking to synchronous DRAM memory, etc.

In various embodiments, one or more of the interface 230, an interrupt controller (not shown), and the fabric 250 uses control logic to ensure coherence among the different processors 210A-210B and the device 260. In some embodiments, this circuitry uses cache coherency logic employing a cache coherency protocol to ensure data accessed by each source is kept up to date. An example of a cache coherency protocol includes the MOESI protocol with the Modified (M), Owned (O), Exclusive (E), Shared (S), and Invalid (I) states.

Figure 3:
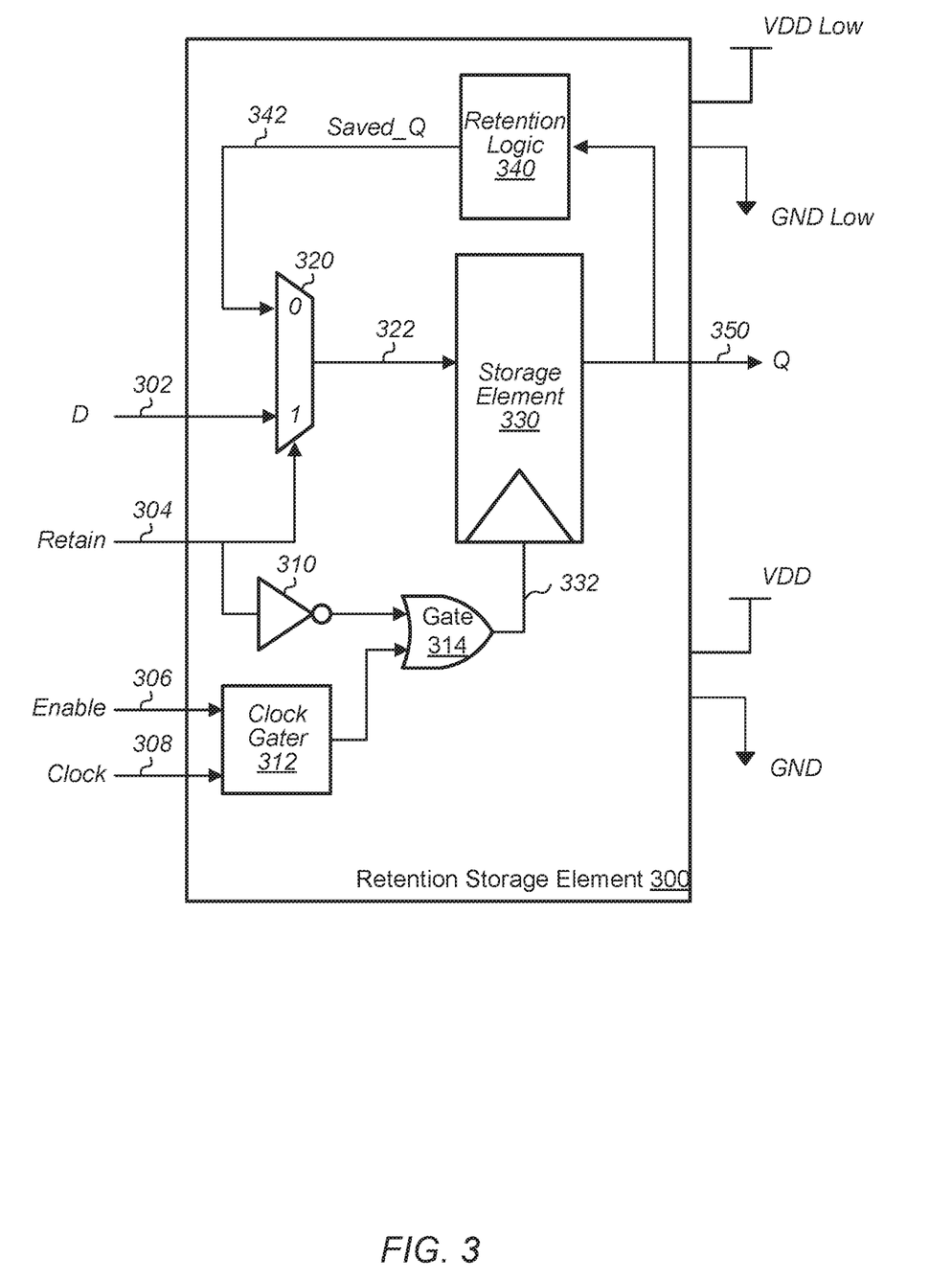
FIG. 3 is a block diagram of one embodiment of a retention storage element.

Referring to FIG. 3, a generalized block diagram of one embodiment of a retention storage element 300 is shown. As shown, the storage element 300 receives four input signals and provides a single data (Q) output signal 350. The input signals are a data (D) input 302, a first control input denoted as retain 304, a second control input denoted as enable 306 and a clock input 308. In the illustrated embodiment, the storage element 300 has a clock input 332 enabled and disabled by the clock gater 312, the inverter 310 and the Boolean OR logic gate 314.

As shown, the rising edge of the clock inputs 308 and 332 are used to allow storage by the storage element 330 of data on the data input 302 when the enable input 306 is asserted. However, in other embodiments, the falling edge of the clock inputs 308 and 332 may be used. Here, a logic high value is used to indicate the enable input 306 is asserted, but in other embodiments, a logic low value may be used. Similarly, a logic low value is used to indicate the retain control input 304 is asserted, but in other embodiments, a logic high value may be used.

The data input 322 for the storage element 330 is gated by the multiplexer gate 320. In addition, the retention logic 340 receives the output 350 of the storage element 330 as an input value and provides the value as an input 342 to the multiplexer gate 320. The selection logic of the multiplexer gate 320 is based on the retain control input 304. The multiplexer gate 320 receives the data input 302 and the retained input 342 as input values. Although four inputs and one output are shown for the retention storage element 300, in other embodiments, a variety of other input signals and output signals are used. Examples of other signals are a test control input, test input data, another clock input, a complementary output signal, and so on.

As shown, the retention storage element 300 uses two supply voltages VDD and VDD Low as well as two ground values GND and GND Low. In various embodiments, the retention storage element 300 uses two pairs of voltage planes. A first pair includes the power planes designated as "VDD" and "GND" and the second pair includes the power planes designated as "VDD Low" and "GND Low". In some embodiments, only one ground plane is used rather than two ground planes. In other embodiments, a virtual ground plane is used which is coupled to a physical ground plane through a sleeper gate such as a field effect transistor. In an embodiment, the retention logic uses the supply voltage VDD Low whereas the remaining components of the retention storage element 300 uses the supply voltage VDD.

In various embodiments, the supply voltage VDD is coupled to a power plane through power switches which allows the supply voltage VDD to be removed from supplying any voltage magnitude to components of the retention storage element 300. Conversely, in an embodiment, the supply voltage VDD Low may be directly connected to a power plane and continually supplies a voltage magnitude to the retention logic 340. In some embodiments, the supply voltage VDD provides one of multiple supply voltage magnitudes to components of the retention storage element 300. For example, the supply voltage magnitude provided by the supply voltage VDD is adjusted based on power-performance states (P-states) selected by a power manager. In some embodiments, the supply voltage magnitude provided by the supply voltage VDD Low is based on reducing leakage current of devices (transistors) within the retention logic 340.

In various embodiments, the storage element 330 is one of a variety of flip flop circuits utilizing a master-slave latching scheme. As the stored value on the Q output 350, which is also known as the state of the storage element 330, may be lost during power-down modes, the retention logic 340 is used to preserve the state. In various embodiments, the retention logic 340 uses a balloon latch scheme. In other embodiments, the retention logic 340 uses a shadow latch scheme. In some embodiments, the retention logic 340 uses relatively high threshold transistors in order to reduce leakage current and corresponding leakage power consumption as these transistors are not powered down.

In various embodiments, the retention storage element 300 operates in a retention mode, which overlaps a powered-down mode. For example, the retention mode may begin shortly before the powered-down mode actually starts and the retention mode may end shortly after the powered-down mode actually finishes. In order to provide functional timing for the retention of state of the storage element 330, in some embodiments, no writes accesses for the retention storage element 300 are permitted to occur at least one to clock cycle before the retention mode begins. In addition, no writes accesses for the retention storage element 300 are permitted to occur at least one to clock cycle after the retention mode finishes. When the power-down mode ends and the voltage supply VDD once again supplies a voltage magnitude to the components of the retention storage element 300, the value held on the line 342 (Saved_Q) is immediately available for storage in the storage element 330.

Figure 4:
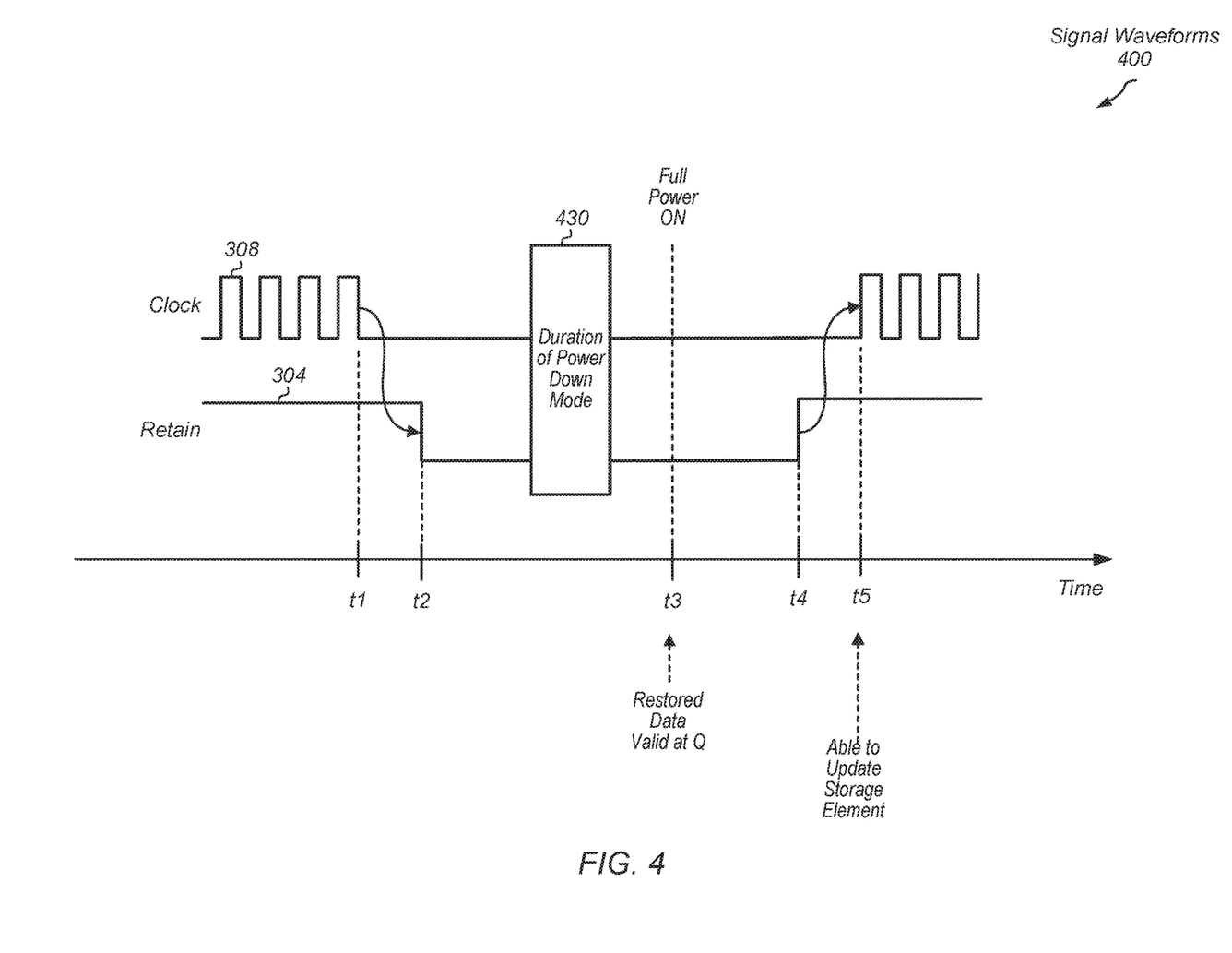
FIG. 4 is a block diagram of one embodiment of a timing diagram for a retention storage element.

Referring to FIG. 4, a generalized block diagram of one embodiment of a timing diagram 400 for a retention storage element is shown. In various embodiments, the timing diagram 400 may be used for the retention storage element 300 of FIG. 3. Signals previously described are numbered identically. As described earlier, the retention mode overlaps the powered-down mode. As shown, the retention mode occurs while the retain control input 304 is asserted. As described earlier, the retain control input 304 is asserted with a logic low value, but in other embodiments, a logic high value may be used. Here, the retention mode lasts between time t2 and t4. The duration of the powered-down mode 430 occurs within the time window of the retention mode, such as the shown time window which is a subset of the time between t2 and t3.

The clock input 308 is toggling until time t1 is reached. Shortly after, the retain control input 304 is asserted at time t2, which "locks" the state of the retention storage element in the retention logic. Referring briefly again to FIG. 3, the multiplexer gate 320 selects the data on the on the line 342 (Saved_Q) when the retain control input 304 is asserted (logic low in the illustrated embodiment). Afterward, power switches are turned off, the supply voltage magnitudes decrease to a zero value and then the powered-down mode begins. However, a voltage magnitude is still supplied to the retention logic.

Later, the operating system scheduler detects applications to run again, and begins a power up sequences. The duration of the powered-down mode 430 ends prior to reaching time t3, the power switches are turned on, the clock signal 308 remains deasserted, and then the retain control input 304 is deasserted at time t3. Accordingly, the state of the retention storage element stored in the retention logic is available for being provided on the output of the storage element, thus, restoring the state. Again, briefly referring to FIG. 3, the data stored on line 342 is provided on the output line 350 of the retention logic from time t2 to time t4. Various embodiments of balloon and shadow latches allow for providing the state on the output of the storage element based on the asserted retain control input 304 rather than the clock input 308.

At time t4, the retain control 304 is deasserted, and thus, ends the retention mode. At time t5, the clock input 308 begins toggling again, and the storage element, such as a flip-flop circuit, within the retention storage element is available once again for updates. Although the clock input 308 used by the retention storage element does not toggle until time t5, it is possible other storage elements using another clock receive the retained state on the output line 350 of the retention storage element from time t3 to time t4 as the retained state is available from time t2 to time t4. Other control logic also may receive the retained state and use it during this time period before updates are permitted to the retention storage element. In various embodiments, the retained state includes a subset of the architected state and it is used in one of a variety of ways when the processor is waking up again for processing activity. As described earlier, another subset of the architected state which was not retained, such as at least the integer and floating-point general purpose registers, are initialized. In some embodiments, instructions are to be fetched from a location pointed to by the restored program counter rather than from a location pointed to by a reset base address register. Therefore, at least the program counter value stored in the retention storage element is read between time t3 and t4.

Figure 5:
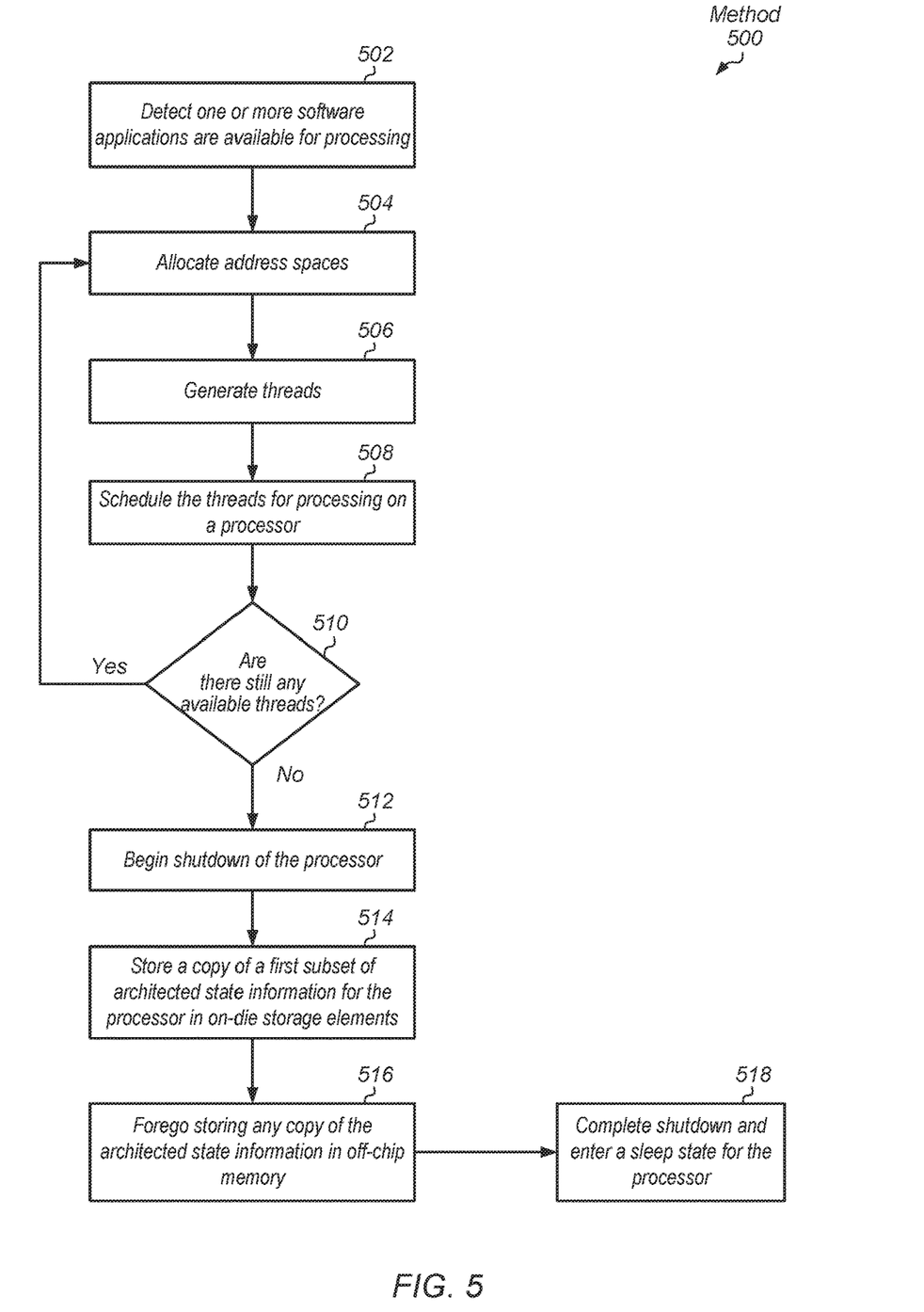
FIG. 5 is a flow diagram of one embodiment of a method for retaining architected state when switching from a processor active state to a processor sleep state.

Referring now to FIG. 5, a generalized flow diagram of one embodiment of a method 500 for retaining architected state when switching from a processor active state to a processor sleep state is shown. For purposes of discussion, the steps in this embodiment (as well as in FIGS. 6 and 7) are shown in sequential order. However, in other embodiments some steps may occur in a different order than shown, some steps may be performed concurrently, some steps may be combined with other steps, and some steps may be absent.

One or more software applications are detected as being available for processing in a computing system (block 502). The kernel of an operating system divides the one or more software applications into processes, assigns an address space (block 504), and further divides the processes into threads (block 506). Following, the kernel allocates the threads to one or more processors for execution (block 508). The operating system scheduler within the kernel performs the allocation (scheduling) of the threads. In some embodiments, the computing system is an embedded system such as a system-on-a-chip (SOC). Each of the one or more software applications may be one of a variety of applications available for business applications, medical applications, social media applications, multimedia playback such as movies, song recordings and video games, and so on.

If there are still any available threads for scheduling ("yes" leg of the conditional block 510), then control flow of method 500 returns to block 504 where address spaces are allocated for the threads to process. If there are not any available threads for scheduling ("no" leg of the conditional block 510), then shutdown of the processor begins (block 512). As described earlier, the shutdown procedure directs the processor to take steps in preparation for entering a sleep state.

A copy of a first subset of the architected state information is stored for the processor in on-die storage elements (block 514). There is no storing of any copy of the architected state information in off-chip memory (block 516). When the first subset is retained, one or more levels of the cache memory subsystem are flushed, and power switches are turned off, the shutdown sequence completes for the processor and the processor enters a sleep state (block 518).

Figure 6:
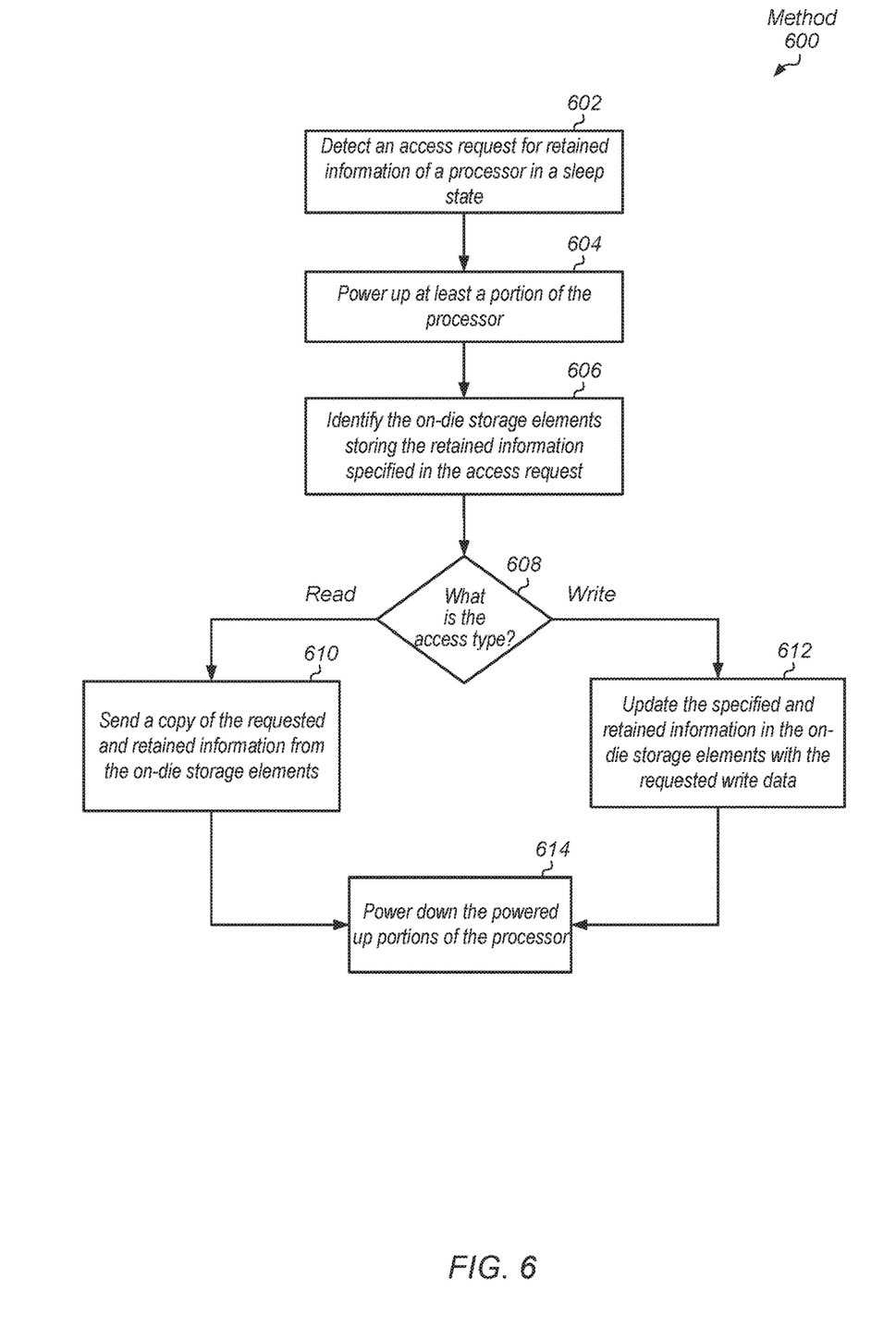
FIG. 6 is a flow diagram of one embodiment of a method for accessing the retained architected state during the processor sleep state.

Turning now to FIG. 6, a generalized flow diagram of one embodiment of a method 600 for accessing the retained architected state during the processor sleep state is shown. An access request is detected for retained information of a processor in a sleep state (block 602). As described earlier, the retained information includes both a first subset of architected state information as well as non-architected state information. In various embodiments, permission checking occurs to allow for only valid accesses even for read accesses. In some embodiments, the permission checking occurs prior to powering up any portion of the processor. In other embodiments, the permission checking occurs after powering up a portion of the processor.

At least a portion of the processor is powered up (block 604). The on-die storage elements which store the retained information specified in the access request are identified (block 606). If the access type is a read request ("read" leg of the conditional block 608), then a copy of the requested and retained information is sent from the on-die storage elements (block 610). If the access type is a write request ("write" leg of the conditional block 608), then the specified and retained information in the on-die storage elements is updated with the requested write data (block 612). When the access completes, the powered up portions of the processor are powered down once again (block 614).

Figure 7:
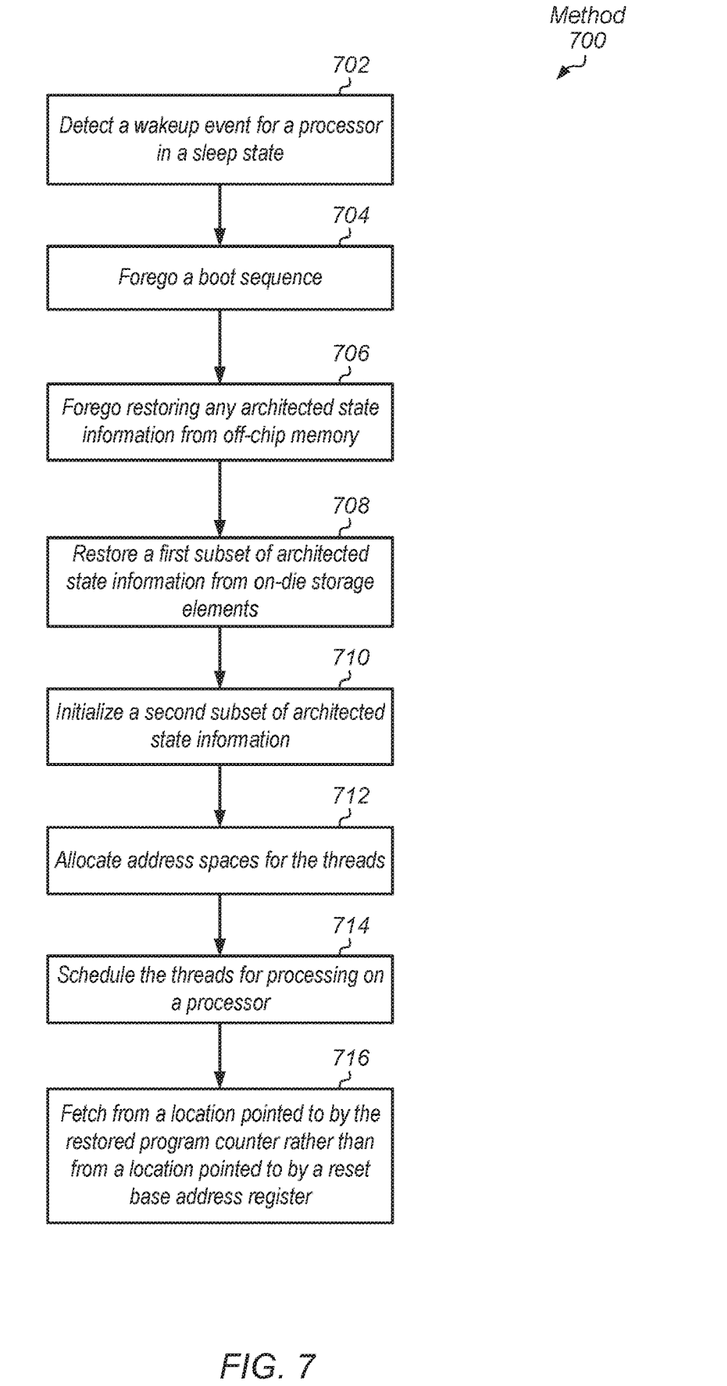
FIG. 7 is a flow diagram of one embodiment of a method for returning architected state when switching from a processor sleep state to a processor active state.

Referring now to FIG. 7, a generalized flow diagram of one embodiment of a method 700 for returning architected state when switching from a processor sleep state to a processor active state is shown. A wakeup event is detected for a processor in a sleep state (block 702). A boot sequence is not performed (block 704). As described earlier, the boot sequence is not necessary as the restored program counter is used instead.

Restoring any architected state information from off-chip memory is not performed (block 706). As described earlier, no architected state was previously retained in off-chip memory, so there is no information to restore. Power switches are turned on and a reset of the processor is performed. A first subset of the architected state information is restored from on-die storage elements (block 708).

A second subset of the architected state information, which was not previously retained, is initialized (block 710). Address spaces are allocated for the threads (block 712). The threads for processing on a processor are scheduled (block 714). Instructions are fetched from a location pointed to by the restored program counter rather than from a location pointed to by a reset base address register (block 716). In some embodiments, the address which is an incremented address of the restored program counter points to memory locations storing instructions of an interrupt handler. Once the corresponding subroutine completes, the scheduled threads are executed.

Figure 8:
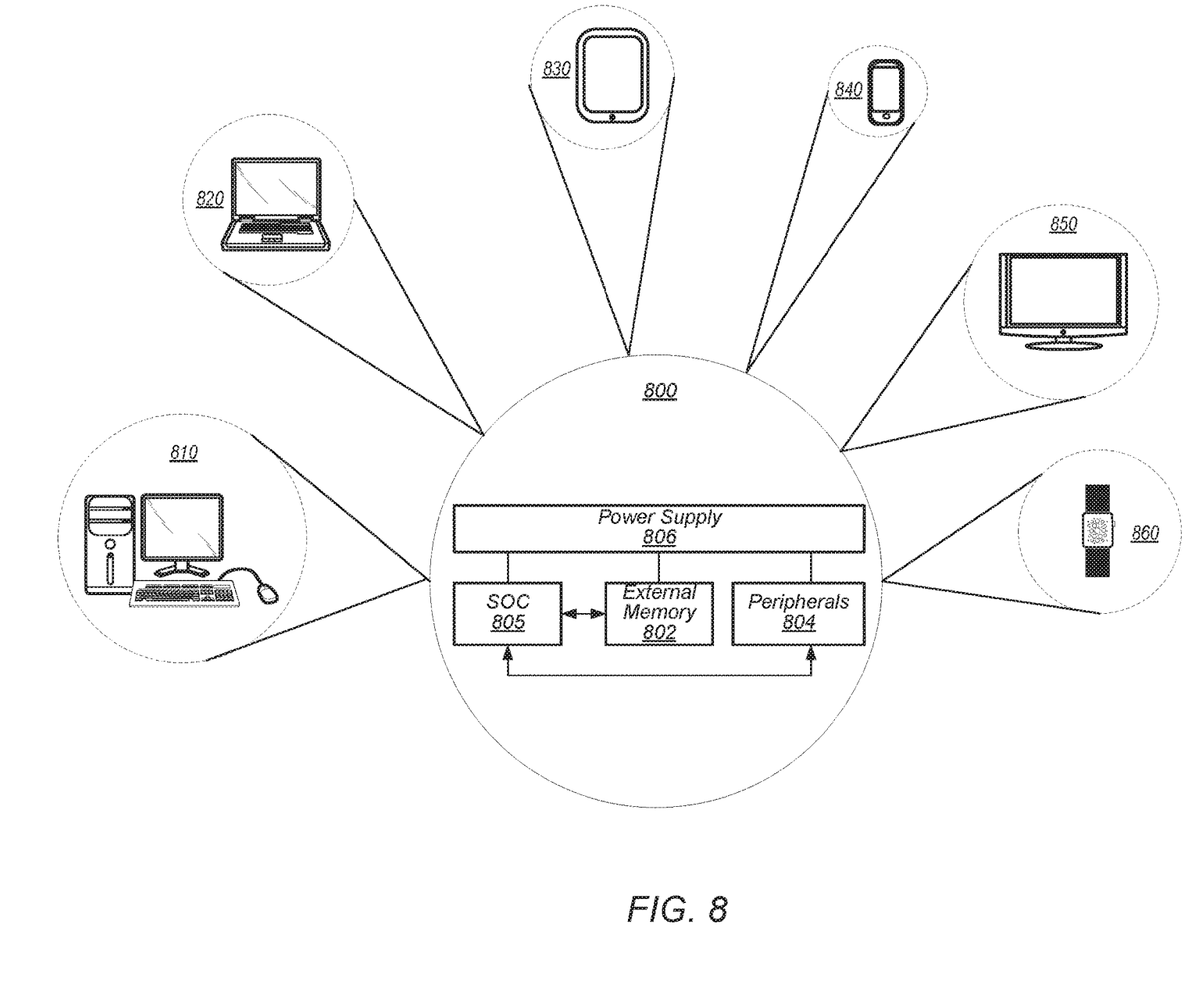
FIG. 8 is a block diagram of another embodiment of a system.

Turning next to FIG. 8, a block diagram of one embodiment of a system 800 is shown. As shown, system 800 may represent chip, circuitry, components, etc., of a desktop computer 810, laptop computer 820, tablet computer 830, cell or mobile phone 840, television 850 (or set top box configured to be coupled to a television), wrist watch or other wearable item 860, or otherwise. Other devices are possible and are contemplated. In the illustrated embodiment, the system 800 includes at least one instance of an embedded processor such as a system on a chip (SOC) 805 (of FIG. 2) coupled to an external memory 802.

SOC 805 is coupled to one or more peripherals 804 and the external memory 802. A power supply 806 is also provided which supplies the supply voltages to SOC 805 as well as one or more supply voltages to the memory 802 and/or the peripherals 804. In various embodiments, power supply 806 may represent a battery (e.g., a rechargeable battery in a smart phone, laptop or tablet computer). In some embodiments, more than one instance of SOC 805 may be included (and more than one external memory 802 may be included as well).

The memory 802 may be any type of memory, such as dynamic random access memory (DRAM), solid state disks (SSDs) or a variety of other examples of off-chip memory. One or more memory devices may be coupled onto a circuit board to form memory modules such as single inline memory modules (SIMMs), dual inline memory modules (DIMMs), etc. Alternatively, the devices may be mounted with an SoC or IC containing SOC 805 in a chip-on-chip configuration, a package-on-package configuration, or a multi-chip module configuration.

The peripherals 804 may include any desired circuitry, depending on the type of system 800. For example, in one embodiment, peripherals 804 may include devices for various types of wireless communication, such as Wi-Fi, Bluetooth, cellular, global positioning system, etc. The peripherals 804 may also include additional storage, including RAM storage, solid state storage, or disk storage. The peripherals 804 may include user interface devices such as a display screen, including touch display screens or multi-touch display screens, keyboard or other input devices, microphones, speakers, etc.

In various embodiments, program instructions of a software application may be used to implement the methods and/or mechanisms previously described. The program instructions may describe the behavior of hardware in a high-level programming language, such as C. Alternatively, a hardware design language (HDL) may be used, such as Verilog. The program instructions may be stored on a non-transitory computer readable storage medium. Numerous types of storage media are available. The storage medium may be accessible by a computer during use to provide the program instructions and accompanying data to the computer for program execution. In some embodiments, a synthesis tool reads the program instructions in order to produce a netlist comprising a list of gates from a synthesis library.

It should be emphasized that the above-described embodiments are only non-limiting examples of implementations. Numerous variations and modifications will become apparent to those skilled in the art once the above disclosure is fully appreciated. It is intended that the following claims be interpreted to embrace all such variations and modifications.

What is claimed is:

1. A processor comprising:
   a memory interface configured to access off-chip memory;
   a core configured to process instructions;
   a plurality of on-die storage elements configured to store architected state information of the processor, wherein a first subset of the plurality of on-die storage elements comprises retention logic configured to store a copy of architected state information stored within the given on-die storage element, concurrent with storage of the architected state information in the given on-die storage element and prior to detection of an indication to transition from a processor active state to a processor sleep state; and
   control logic configured to, based at least in part on the detection of the indication to transition from the processor active state to the processor sleep state:
      retain a copy of architected state information stored within the first subset of the plurality of on-die storage elements, without retaining architected state information stored in a second subset of the plurality of on-die storage elements in any of the plurality of on-die storage elements and the off-chip memory; and transition the processor to the processor sleep state.

2. The processor as recited in claim 1, wherein based at least in part on a detection of an indication to transition from the processor sleep state to the processor active state, the control logic is configured to retrieve the copy of the architected state information from the first subset of the plurality of on-die storage elements to restore the architected state information.

3. The processor as recited in claim 2, wherein the control logic is further configured to initialize data for storage in the second subset of the plurality of on-die storage elements to restore the architected state information.

4. The processor as recited in claim 2, wherein the control logic is further configured to fetch an instruction from a memory location pointed to by a restored program counter of the architected state information rather than from a memory location pointed to by a reset base address register.

5. The processor as recited in claim 1, wherein based at least in part on a detection of an access request for the architected state information while the processor is in the processor sleep state, the control logic is further configured to:
power up at least a first portion of the processor; and
identify one or more of the first subset of the plurality of on-die storage elements storing a given subset of the architected state information specified in the access request.

6. The processor as recited in claim 5, wherein based at least in part on a detection that the access request is a read request, the control logic is further configured to:
send a copy of the given subset of the architected state information from the one or more of the first subset of the plurality of on-die storage elements as a response to the access request; and
power down the first portion of the processor.

7. The processor as recited in claim 5, wherein the control logic is further configured to, based at least in part on a detection that the access request is a write request:
update the given subset of the architected state information in the one or more of the first subset of the plurality of on-die storage elements with write data; and
power down the first portion of the processor.

8. A method comprising:
accessing, by a memory interface, off-chip memory;
processing, by a core, instructions;
storing, by control logic, architected state information of the processor in a plurality of on-die storage elements, wherein a first subset of the on-die storage elements comprises retention logic
that stores a copy of architected state information stored within the given on-die storage element, concurrent with storage of the architected state information in the given on-die storage element and prior to detection of an indication to transition from a processor active state to a processor sleep state; and
in response to detecting the indication to transition from the processor active state to the processor sleep state:
retaining, by control logic, a copy of architected state information stored within the first subset of the plurality of on-die storage elements, without retaining architected state information stored in a second subset of the plurality of on-die storage elements in any of the plurality of on-die storage elements and the off-chip memory; and
transitioning, by the control logic, the processor to the processor sleep state.

9. The method as recited in claim 8, further comprising retrieving the copy of the architected state information from the first subset of the plurality of on-die storage elements to restore the architected state information, in response to detecting an indication to transition from the processor sleep state to the processor active state.

10. The method as recited in claim 9, further comprising initializing data for storage in the second subset of the plurality of on-die storage elements to restore the architected state information.

11. The method as recited in claim 9, further comprising fetching an instruction from a memory location pointed to by a restored program counter of the architected state information rather than from a memory location pointed to by a reset base address register.

12. The method as recited in claim 9, further comprising foregoing a boot sequence.

13. The method as recited in claim 9, further comprising supplying a first voltage to the retention logic of the first subset of the plurality of on-die storage elements that is less than a second voltage supplied to the second subset of the plurality of on-die storage elements during the processor active state.

14. The method as recited in claim 8, wherein in response to detecting an access request for the architected state information while the processor is in the processor sleep state, the method further comprises:
powering up at least a first portion of the processor; and
identifying one or more of the first subset of the plurality of on-die storage elements storing a given subset of the architected state information specified in the access request.

15. The method as recited in claim 14, wherein in response to detecting the access request is a read request, the method further comprises:
sending a copy of the given subset of the architected state information from the one or more of the first subset of the plurality of on-die storage elements as a response to the access request; and
powering down the first portion of the processor.

16. The method as recited in claim 14, further comprising, in response to detecting the access request is a write request:
updating the given subset of the architected state information in the one or more of the first subset of the plurality of on-die storage elements with write data; and
powering down the first portion of the processor.

17. A computing system comprising:
a memory;
a processor configured to:
process instructions;
store architected state information of the processor in a plurality of on-die storage elements, wherein a first subset of the on-die storage elements comprises retention logic
configured to store a copy of architected state information stored within the given on-die storage element, concurrent with storage of the architected state information in the given on-die storage element and prior to detection of an indication to transition from a processor active state to a processor sleep state; and
in response to detecting the indication to transition from the processor active state to the processor sleep state:
retain a copy of architected state information stored within the first subset of the plurality of on-die storage elements, without retaining architected state information stored in a second subset of the plurality of on-die storage elements in any of the plurality of on-die storage elements and the off-chip memory; and transition the processor to the processor sleep state.

18. The computing system as recited in claim 17, wherein the processor is further configured to, based at least in part on a detection of an indication to transition from the processor sleep state to the processor active state, retrieve the copy of the architected state information from the first subset of the plurality of on-die storage elements to restore the architected state information.

19. The computing system as recited in claim 18, wherein the processor is further configured to initialize data for storage in the second subset of the plurality of on-die storage elements to restore the architected state information.

20. The computing system as recited in claim 18, wherein the processor is further configured to fetch an instruction from a memory location pointed to by a restored program counter of the architected state information rather than from a memory location pointed to by a reset base address register.

\* \* \* \* \*